(12) United States Patent
Yamaguchi et al.

(10) Patent No.: US 11,427,138 B2
(45) Date of Patent: Aug. 30, 2022

(54) DOOR WIRING MODULE

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Koji Yamaguchi, Mie (JP); Housei Mizuno, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/296,356

(22) PCT Filed: Nov. 6, 2019

(86) PCT No.: PCT/JP2019/043399
§ 371 (c)(1),
(2) Date: May 24, 2021

(87) PCT Pub. No.: WO2020/110630
PCT Pub. Date: Jun. 4, 2020

(65) Prior Publication Data
US 2022/0009426 A1    Jan. 13, 2022

(30) Foreign Application Priority Data
Nov. 26, 2018  (JP) .............................. JP2018-220720

(51) Int. Cl.
*B60R 16/02*    (2006.01)
*H01B 7/08*    (2006.01)
(Continued)

(52) U.S. Cl.
CPC ............. *B60R 16/0207* (2013.01); *B60J 5/04* (2013.01); *H01B 7/08* (2013.01); *H02G 3/305* (2013.01)

(58) Field of Classification Search
CPC ... B60R 16/0207; B60R 16/0215; H01B 7/08; H01B 7/0815; H01B 7/285; H02G 3/30; H02G 3/305
See application file for complete search history.

(56) References Cited

U.S. PATENT DOCUMENTS 4,907,836 A * 3/1990 Ueda ....................... B60R 13/02
296/146.7
6,000,959 A 12/1999 Curtindale et al.
(Continued)

FOREIGN PATENT DOCUMENTS

JP           05-46608       6/1993
JP           09-17239       1/1997
(Continued)

OTHER PUBLICATIONS

International Search Report issued in International Patent Application No. PCT/JP2019/043399, dated Jan. 7, 2020, along with an English translation thereof.
(Continued)

*Primary Examiner* — Hoa C Nguyen
*Assistant Examiner* — Amol H Patel
(74) *Attorney, Agent, or Firm* — Greenblum & Bernstein, P.L.C.

(57) ABSTRACT

A door wiring module includes a door functional planar member and a wiring member. The door functional planar member is incorporated between a door panel and a design trim in a door of a vehicle. The wiring member is wired on
(Continued)

a planar part of a main surface of the door functional planar member where a groove is not formed, and fixed to the door functional planar member.

9 Claims, 11 Drawing Sheets

(51) Int. Cl.
*H02G 3/30* (2006.01)
*H01B 7/285* (2006.01)
*B60J 5/04* (2006.01)

(56) References Cited

U.S. PATENT DOCUMENTS

| | | |
|---|---|---|
| 2006/0090920 A1 | 5/2006 | Fujita |
| 2016/0176368 A1* | 6/2016 | Osada .............. B60R 16/0207 174/72 A |
| 2020/0062198 A1 | 2/2020 | Mizushita et al. |

FOREIGN PATENT DOCUMENTS

| | | |
|---|---|---|
| JP | H0917239 A * | 1/1997 |
| JP | 09-76837 | 3/1997 |
| JP | 2001-513721 | 9/2001 |
| JP | 2006027378 A * | 2/2006 |
| JP | 2006-117052 | 5/2006 |
| JP | 2012-50305 | 3/2012 |
| JP | 2012-155991 | 8/2012 |
| JP | 2016-210338 | 12/2016 |
| WO | 2018/207695 | 11/2018 |

OTHER PUBLICATIONS

International Preliminary Report on Patentability (IPRP) issued in International Patent Application No. PCT/JP2019/043399, dated May 27, 2021, along with an English translation thereof.
Japan Office Action issued in Japan Patent Application No. 2018-220720, dated Feb. 8, 2022, together with English translation thereof.

* cited by examiner

F I G. 1 0
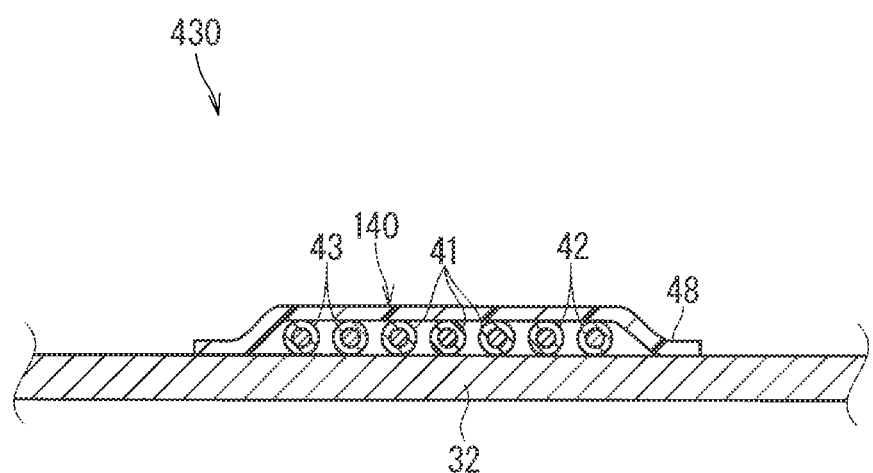

DOOR WIRING MODULE

TECHNICAL FIELD

The present disclosure relates to a door wiring module.

BACKGROUND ART

Patent Document 1 discloses a technique of locating an attaching piece passing through and holding a door harness on part of a weather strip attached to an outer peripheral edge of a door to be integral with the weather strip.

PRIOR ART DOCUMENTS

Patent Documents

Patent Document 1: Japanese Patent Application Laid-Open No. 9-76837

SUMMARY

Problem to be Solved by the Invention

However, according to the technique disclosed in Patent Document 1, the weather strip is a waterproof member which is made up of an elastic material and has an elongated narrow band-like shape, thus a shape of the door harness is not maintained constant depending on the weather strip and is hardly assembled to the door.

Accordingly, an object is to easily assemble a wiring member to a door of a vehicle.

Means to Solve the Problem

A door wiring module according to the present disclosure is a door wiring module including: a door functional planar member incorporated between a door panel and a design trim in a door of a vehicle; and a wiring member wired on a planar part of a main surface of the door functional planar member to be fixed to the door functional planar member.

Effects of the Invention

According to the present disclosure, the wiring member can be easily assembled to the door of the vehicle.

BRIEF DESCRIPTION OF DRAWINGS

FIG. 10 is a schematic cross-sectional view illustrating a fourth modification example of the door wiring module.

DESCRIPTION OF EMBODIMENT(S)

[Description of Embodiment of Present Disclosure]

Figure 1:
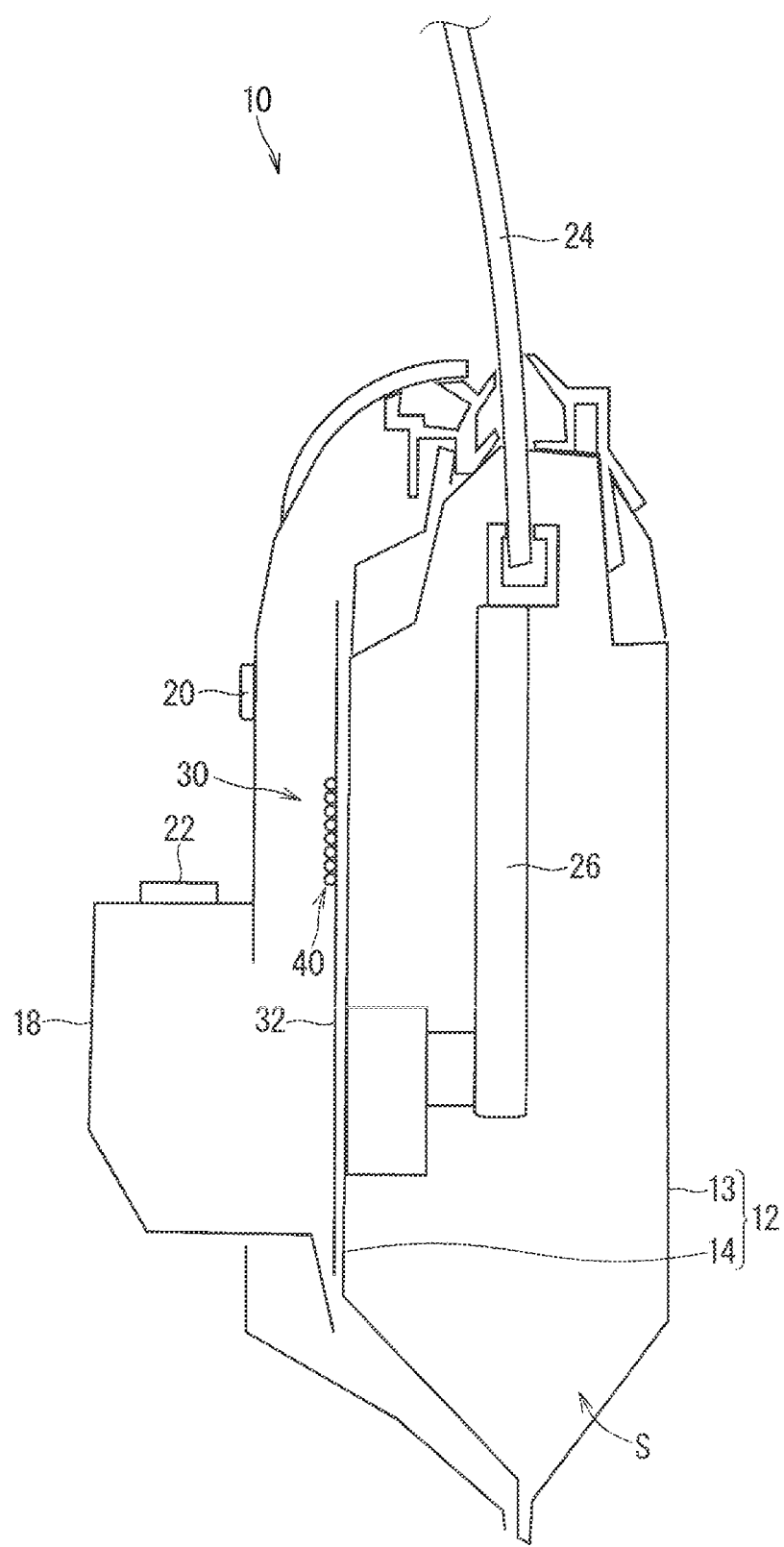
FIG. 1 is an explanation diagram illustrating a position where a door wiring module is assembled in a door.

Embodiments of the present disclosure are listed and described firstly.

A door wiring module according to the present disclosure is as follows.

(1) A door wiring module according to the present disclosure is a door wiring module including: a door functional planar member incorporated between a door panel and a design trim in a door of a vehicle; and a wiring member wired on a planar part of a main surface of the door functional planar member to be fixed to the door functional planar member. The wiring member is wired and fixed to the door functional planar member incorporated into the door of the vehicle. The door functional planar member is incorporated into the door of the vehicle, thus the wiring member can be incorporated into the door of the vehicle. At this time, the wiring member is wired and fixed by the door functional planar member, thus the wiring member can be kept in a spread state at a time of assembling the door functional planar member, and can be assembled easily. The wiring Member is fixed to the door functional planar member assembled for the other purpose of usage, thus a thickness of the door can be reduced, and furthermore, a vehicle interior space can be increased.

(2) The wiring member may include a plurality of covering wires wired side by side on the main surface of the door functional planar member. Accordingly, the door wiring module can be thinned, and the thickness of the door of the vehicle can be reduced. Accordingly, an in-vehicle space can be increased. The covering wire is used, thus cost can be reduced compared with a case where a flexible flat cable or a flexible print substrate, for example, is used.

(3) The covering wire may be fixed to the door functional planar member by a contact area direct fixation. Accordingly, a member for fixing the covering wire and the door functional planar member can be omitted.

(4) it is also applicable that the wiring member includes a sheet member holding the plurality of covering wires in a state of being located side by side, and the sheet member is fixed to the door functional planar member. Accordingly, the wiring member which has been previously wired can be fixed to the door functional planar member.

(5) The door functional planar member may be an inner trim. Accordingly, the inner trim and the wiring member can be integrally formed.

(6) The door functional planar member may be a waterproof film. Accordingly, the waterproof film and the wiring member can be integrally formed.

(7) The door functional planar member may be a soundproof member. Accordingly, the soundproof member and the wiring member can be integrally formed.

[Details of Embodiment of Present Disclosure]

Specific examples of a door wiring module of the present disclosure are described hereinafter with reference to the drawings. The present invention is not limited to these examples, but is indicated by claims, and it is intended that meanings equivalent to claims and all modifications within a scope of claims are included.

[Embodiment]

Figure 2:
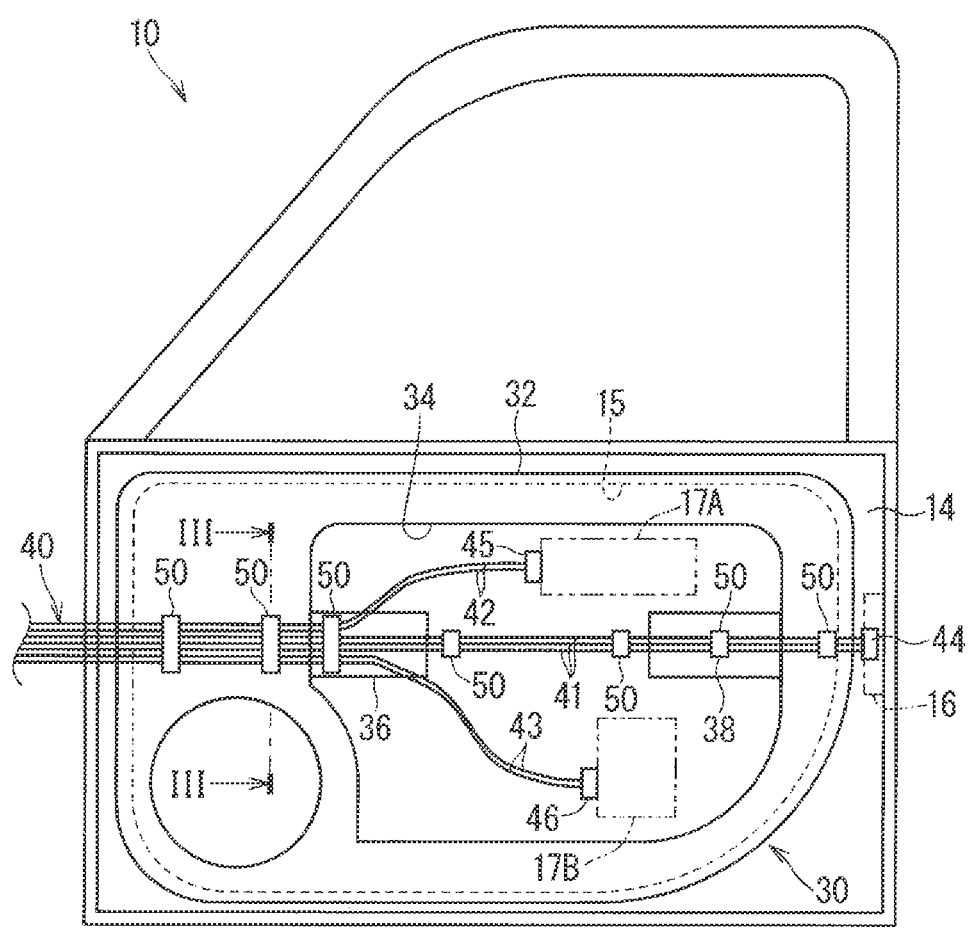
FIG. 2 is a schematic side view illustrating door wiring module according to an embodiment and a door into which the door wiring module is incorporated.
Figure 3:
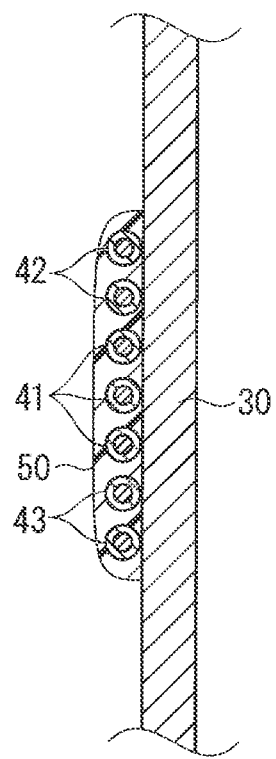
FIG. 3 is a schematic cross-sectional view of the door wiring module and the door cut along a III-III line in FIG. 2.
Figure 4:
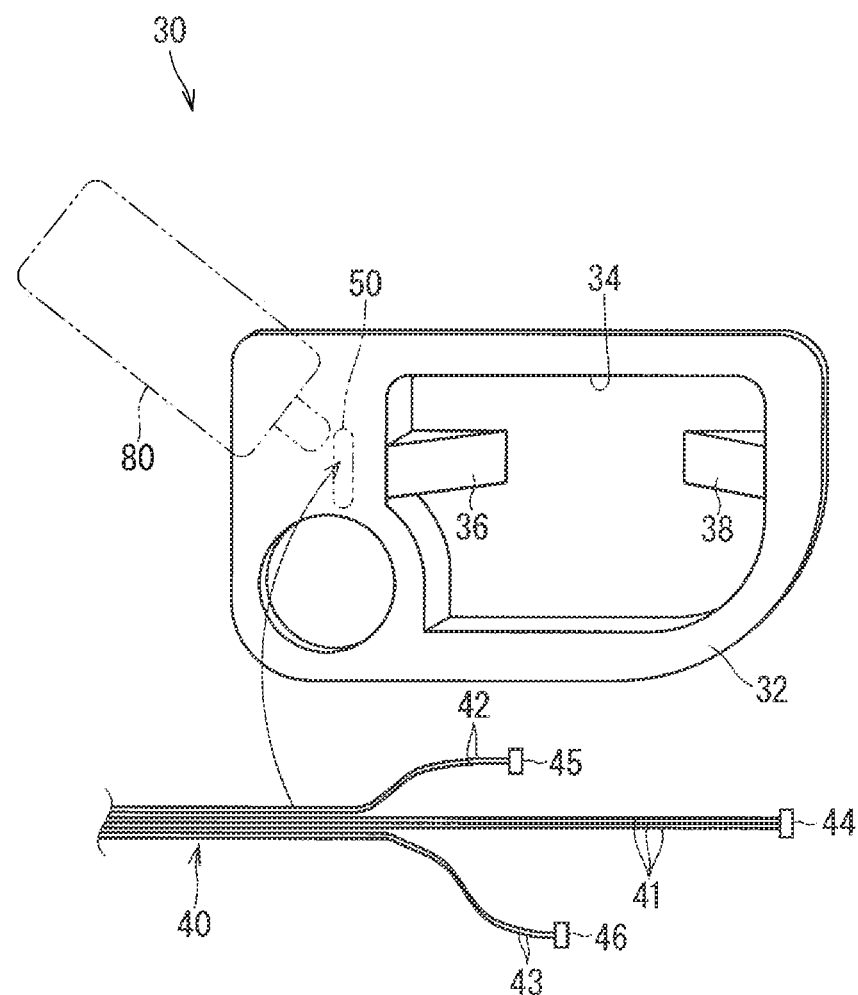
FIG. 4 is a schematic exploded perspective view of the door wiring module.

A door wiring module according to an embodiment is described hereinafter. FIG. 1 is an explanation diagram illustrating a position a door wiring module 30 is assembled in a door 10. FIG. 2 is a schematic side view illustrating the door wiring module 30 according to the embodiment and the door 10 into which the door wiring module 30 is incorporated. FIG. 3 is a schematic cross-sectional view of the door wiring module 30 and the door 10 cut along a III-III line in FIG. 2. FIG. 4 is a schematic exploded perspective view of the door wiring module 30.

The door 10 is formed into a flat shape as a whole, and is a part openable and closable to partition an inner side and outer side of a vehicle. The door 10 is assumed to be a driver side door, a passenger's side door, and a rear seat door, for example. The door 10 includes a door panel 12, a design trim 18, and the door wiring module 30.

The door panel 12 includes an outer panel 13 and an inner panel 14. The outer panel 13 is provided in a part of the door 10 facing the outer side of the vehicle to constitute an appearance of the vehicle together with a body part. The inner panel 14 is provided on a vehicle interior side of the outer panel 13. The inner panel 14 is provided with an opening 15.

The design trim 18 is a part provided in a part of the door 10 facing the inner side of the vehicle to constitute the interior of the vehicle. A door handle 20 and an operation part 22 of an in-vehicle apparatus, for example, are attached to the design trim 18.

The door wiring module 30 includes a door functional planar member 32 and a wiring member 40. The door wiring module 30 is assembled to the door panel 12, thereby being incorporated into the door 10, for example.

The door functional planar member 32 is a member incorporated between the door panel 12 and the design trim 18 in the door 10 of the vehicle. The wiring member 40 is fixed to the door functional planar member 32. The door functional planar member 32 is a planar member having a function for the door 10 in addition to the function of fixing the wiring member 40. The planar member herein indicates a member having a thickness dimension smaller than a dimension in a planar direction (two directions perpendicular to a thickness direction) and two-dimensionally spread. It needs not necessarily be perfectly flat in a front-back direction (the thickness direction), but a convex-concave portion may occur in the front-back direction.

In the description herein, the door functional planar member 32 is an inner trim 32 covering the opening 15 formed in the inner panel 14 in the door panel 12. The door functional planar member 32 is a flat component having an area substantially equal to or larger than the opening 15. The door functional planar member 32 is assembled to the opening 15 of the inner panel 14 to cover the opening 15. Accordingly, the door functional planar member 32 can partition the inner side and outer side of the vehicle. The door functional planar member 32 is attached to the opening 15 of the inner panel 14, and the attaching state is retained by a screwing structure or a locking structure, for example. For example, when a part of a peripheral part of the door functional planar member 32 overlapping with the inner panel 14 is screwed to the inner panel 14 using a screw, for example, a gap therebetween can be practicably covered.

A space S is formed between the outer panel 13 and the inner panel 14 and between the outer panel 13 and the door functional planar member 32 in a state where the door functional planar member 32 is assembled to the inner panel 14. A window 24 of the door 10 can be housed in this space S. The window 24 exposed to a rainwater environment is housed in the space S, and a slit-like opening through which the window 24 goes in and out is formed on an upper side of the space S. Thus, the space S is a space which water may enter. The space S is a space which may be connected to an outer space, thus is also a space which a wind noise, for example, may enter from outside.

Thus, the door functional planar member 32 is provided as a member for completely partitioning a vehicle interior space and an outer space with the inner panel 14.

The door functional planar member 32 is a component in which resin or metal, for example, as a material is molded. The door functional planar member 32 may be molded by pouring a molten material into a mold or by performing a press molding on a planar material using a mold.

It is sufficient that the door functional planar member 32 has rigidity to be hardly beaded in a front-back direction. Accordingly, when the door functional planar member 32 is assembled to the door panel 12, an edge part thereof is hardly beaded, thus the door functional planar member 32 is easily kept in a spread shape, and can be easily assembled. For example, the door functional planar member 32 is formed to have high rigidity.

It is sufficient that a size of the door functional planar member 32 in a planar direction is large enough to be able to cover the opening 15. In the example illustrated in FIG. 1, the opening 15 extends to substantially a whole surface of the inner panel 14, thus the door functional planar member 32 is also formed to have a size corresponding to the whole surface of the inner panel 14. When the door functional planar member 32 is formed to have the size corresponding to the whole surface of the inner panel 14, a major part of the wiring member 40 incorporated into the door 10 can be assembled on the door functional planar member 32.

A storage space forming part 34 may be formed in the door functional planar member 32. The storage space forming part 34 is opened on a side of one main surface (a side of the vehicle interior) of the door functional planar member 32, and is formed into a container shape protruding to a side of the other main surface (outside) of the door functional planar member 32. The storage space forming part 34 is formed into a container shape smaller than the opening 15.

The door functional planar member 32 is fitted into the opening 15 of the inner panel 14, and the storage space forming part 34 is provided on an inner side of the opening 15. An electrical components 17A and 17B incorporated into the door 10 can be incorporated into the storage space forming part 34 of the door functional planar member 32.

Wiring support protrusion parts 36 and 38 are provided to protrude from a part of an outer periphery of the storage space forming part 34 of the door functional planar member 32 toward an inner side of the storage space forming part 34. Each of the wiring support protrusion parts 36 and 38 has an inclined surface whose height dimension gradually reduces from an outer side part of the storage space forming part 34 toward a bottom of the storage space forming part 34.

The wiring member 40 is an electrical wire provided in the door 10 and connected to the electrical components 16, 17A, and 17B provided in the door 10. The wiring member 40 of the door 10 is generally connected to the vehicle at a hinge side of the door 10, and branches off on a route from a front side to a back side of the door 10 to be connected to various electrical components 16, 17A, and 17B. The wiring member 40 is wired on and held by the door functional planar member 32. The wiring herein indicates that the wiring member 40 is wired in a form corresponding to a wiring state at a time of being assembled to the door 10. Accordingly, the door functional planar member 32 is assembled to a predetermined position of the door 10, thus wiring of the part of the wiring member 40 wired on and held by the door functional planar member 32 to the door 10 is completed.

Herein, a branch is formed in the wiring member 40. The branch part of the wiring member 40 is wired on and held by the door functional planar member 32. Accordingly, a branch shape of the branch part is maintained by the door functional planar member 32.

More specifically, the wiring member 40 includes a plurality of electrical wires 41, 42, and 43. A covering wire having a metal core wire with a covering around the core wire can be used as the electrical wires 41, 42, and 43. The core wire may be a single core wire or a stranded wire.

Herein, the plurality of electrical wires 41, 42, and 43 include a first electrical wire 41, a second electrical wire 42, and a third electrical wire 43. The plurality (three herein) first electrical wires 41 are provided, the plurality of (two herein) second electrical wires 42 are also provided, and the plurality of (two herein) third electrical wires are also provided. The plurality of electrical wires 41, 42, and 43 are wired side by side on the door functional planar member 32.

The first electrical wire 41, the second electrical wire 42, and the third electrical wire 43 are collected in a parallel state on each one end side. For example, a common connector is attached to one end portions of the first electrical wire 41, the second electrical wire 42, and the third electrical wire 43. The common connector is connected to a connector of a wiring member on a side of a vehicle body, for example. Accordingly, the electrical components 16, 17A, and 17B provided in the door 10 receive a power supply from a battery mounted to the vehicle body and supplies and receives a signal to and from an ECU or a gateway mounted to the vehicle body, in the example illustrated in FIG. 2, one end portions of the first electrical wire 41, the second electrical wire 42, and the third electrical wire 43 extend to an outer side from the door 10, but may also be housed in the door 10.

The first electrical wire 41 extends longer than the second electrical wire 42 and the third electrical wire 43, and the second electrical wire 42 and the third electrical wire 43 branch off in a middle portion of the first electrical wire 41 in an extension direction. Connectors 44, 45, and 46 are attached to the other end portions of the first electrical wire 41, the second electrical wire 42, and the third electrical wire 43, and the first electrical wire 41, the second electrical wire 42, and the third electrical wire 43 are connected to the electrical components 16, 17A, and 17B via the connectors 44, 45, and 46.

More specifically, the plurality of first electrical wires 41 are held along a certain route from a middle portion of a front edge portion of the door functional planar member 32 in an up-down direction to a middle portion of a back edge portion of the door functional planar member 32 in the up-down direction via one main surface on a front side of the door functional planar member 32, an inclined surface of the wiring support protrusion part 36, an inner surface of a bottom of the storage space forming part 34, an inclined surface of the wiring support protrusion part 38, and one main surface on a back side of the door functional planar member 32. The plurality of first electrical wire 41 extend from a back end portion of the door functional planar member 32 to be connected to the electrical component 16 incorporated into a back portion of the door 10 such as a door lock-unlock motor, for example.

The plurality of second electrical wires 42 are held along a certain route from the middle portion of the front edge portion of the door functional planar member 32 in the up-down direction to a midway portion of the inclined surface of the wiring support protrusion part 36 via one main surface on the front side of the door functional planar member 32 on an upper side of the first electrical wire 41.

The plurality of third electrical wires 43 are held along a certain route from the middle portion of the front edge portion of the door functional planar member 32 in the up-down direction to a midway portion of the inclined surface of the wiring support protrusion part 36 via one main surface on the front side of the door functional planar member 32 on a lower side of the first electrical wire 41.

The plurality of second electrical wires 42 and the plurality of third electrical wires 43 branch off from the first electrical wire 41 in the midway portion of the inclined surface of the wiring support protrusion part 36 and lead into the storage space forming part 34 to be connected to the electrical components 17A and 17B in the storage space forming part 34 such as a motor driving a window open-close jig 26 for opening and closing a window and various switches, for example.

The wiring member 40 is wired on a planar part of the Main surface of the door functional planar member 32, and fixed to the door functional planar member 32. Herein, the planar part is a part of the main surface of the door functional planar member 32 where a groove for housing and holding the wiring member 40 is not formed, and is a part formed into a planar surface shape or a convex surface shape in a width direction of the wiring member 40 (a direction in which the plurality of electrical wires 41, 42, and 43 are arranged). A fixing state of fixing the door functional planar member 32 and the plurality of electrical wires 41, 42, and 43 is not particularly limited except for a configuration that the plurality of electrical wires 41, 42, and 43 are fixed by being housed in and held by the groove formed in the door functional planar member 32, thus various fixing states can be adopted.

Applicable as the above fixing state are a contact area fixation and a non-contact area fixation, or both fixations may be used together. Herein, the contact area fixation indicates that a portion where the door functional planar member 32 and the electrical wires 41, 42, and 43 have contact with each other is stuck and fixed. The non-contact area fixation indicates the fixing state which is not the contact area fixation. For example, a sewing thread, the other sheet material, or an adhesive tape presses the electrical wires 41, 42, and 43 toward the door functional planar member 32, or a sewing thread, the other sheet material, or an adhesive tape surrounds the door functional planar member 32 and the electrical wires 41, 42, and 43, thereby holding the door functional planar member 32 and the electrical wires 41, 42, and 43 to keep the door functional planar member 32 and the electrical wires 41, 42, and 43 fixed to each other. In the description hereinafter, the door functional planar member 32 and the electrical wires 41, 42, and 43 are in the state of the contact area fixation. Each description on the contact area fixation is also applicable to the non-contact area fixation as long as each member and material has a configuration to which the non-contact area fixation is not applicable.

Applicable as the configuration of the contact area fixation are a contact area indirect fixation and a contact area direct fixation, or both fixations may also be used together in different regions. Herein, the contact area indirect fixation indicates that the door functional planar member 32 and the electrical wires 41, 42, and 43 are indirectly stuck and fixed via an intervening member such as an adhesive agent, a gluing agent, and a double-sided adhesive tape provided therebetween. The contact area direct fixation indicates that the electrical wires 41, 42, and 43 and the door functional planar member 32 are directly stuck and fixed without an intervention of the adhesive agent, for example, which is separately provided. Considered in the contact area direct fixation is that resin included in at least one of the door functional planar member 32 and a group of electrical wires 41, 42, and 32 is melted, thus they are stuck and fixed, for example. In the description hereinafter, the door functional planar member 32 and the electrical wires 41, 42, and 43 are in the state of the contact area indirect fixation. Each description on the contact area indirect fixation is also applicable to the contact area direct fixation as long as each member and material has a configuration to which the contact area direct fixation is applicable.

In forming the state of the contact area indirect fixation, herein, the door functional planar member 32 and the electrical wires 41, 42, and 43 are fixed by an adhesive agent 50 such as a hot melt adhesive as illustrated in FIG. 3. The adhesive agent 50 is provided on the door functional planar member 32 by an adhesive agent supplying mechanism 80, for example. At this time, in the example illustrated in FIG. 3, the electrical wires 41, 42, and 43 are buried in the adhesive agent 50. It is obvious that the electrical wires 41, 42, and 43 need not be buried in the adhesive agent 50, however, upper portions of the electrical wires 41, 42, and 43 (on a side opposite to a side facing the door functional planar member 32) may be exposed from the adhesive agent 50.

With regard to the electrical wires 41, 42, and 43 and the adhesive agent 50, the adhesive agent 50 may be provided after the electrical wires 41, 42, and 43 are wired on the door functional planar member 32, or the electrical wires 41, 42, and 43 may be wired on the adhesive agent 50 which has been previously provided on the door functional planar member 32.

According to the door wiring module 30 having the configuration described above, the wiring member 40 is wired and fixed to the door functional planar member 32 incorporated into the door 10 of the vehicle. The door functional planar member 32 is incorporated into the door 10 of the vehicle, thus the wiring member 40 can be incorporated into the door 10 of the vehicle. At this time, the wiring member 40 is wired and fixed to the door functional planar member 32, thus the wiring member 40 can be kept in a spread state at a time of assembling the door functional planar member 32, and can be assembled easily. The wiring member 40 is fixed to the door functional planar member 32 assembled for a purpose of usage different from a purpose of fixing the wiring member 40, thus a thickness of the door 10 can be reduced, and furthermore, a vehicle interior space can be increased.

The wiring member 40 includes the plurality of covering wires 41, 42, and 43 wired side by side on the main surface of the door functional planar member 32, thus the door wiring module 30 can be thinned, and the thickness of the door 10 of the vehicle can be reduced. Accordingly, an in-vehicle space can be increased. The covering wires 41, 42, and 32 are used, thus cost can be reduced compared with a case where a flexible flat cable or a flexible print substrate, for example, is used.

The inner trim 32 is adopted as the door functional planar member 32, and the inner trim 32 and the wiring member 40 can be integrally formed.

[Modification Example]

A modification example of a fixing structure of the door functional planar member 32 and the wiring member 40 is described with a first modification example to a fourth modification example.

Figure 5:
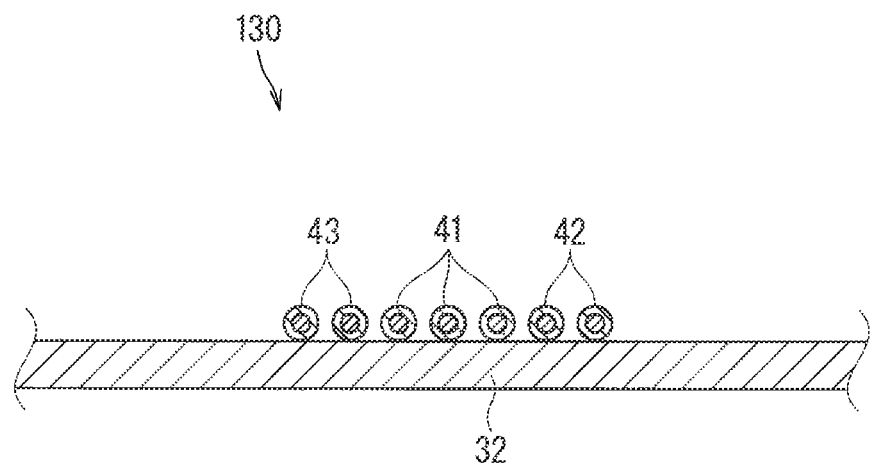
FIG. 5 is a schematic cross-sectional view illustrating a first modification example of the door wiring module.

FIG. 5 is a schematic cross-sectional view illustrating the first modification example of the door wiring module 30.

A door wiring module 130 of the present example indicates a ease example that resin included in one of the door functional planar member 32a and the group of electrical wires 41, 42, and 43 is stuck to the other one thereof, thus they are fixed by a contact area direct fixation. In forming the state of such a contact area direct fixation, the resin is considered to be melted by heat or a solvent, for example. That is to say, the state of the contact area direct fixation may be the state of the contact area direct fixation by the heat or the state of the contact area direct fixation by the solvent. The contact area direct fixation by the heat is preferable.

At this time, a means of forming the state of the contact area direct fixation is not particularly limited, but various means including a known means such as welding, fusion, and melting joint can be used. For example, when the state of the contact area direct fixation by the heat is formed by welding, various welding means such as ultrasonic welding, heating-pressurizing welding, hot air welding, and high frequency welding can be adopted. When the state of the contact area direct fixation is formed by these means, the door functional planar member 32 and the electrical wires 41, 42, and 43 are in the state of the contact area direct fixation by these means. Specifically, when the state of the contact area direct fixation is formed by the ultrasonic welding, for example, the door functional planar member 32 and the electrical wires 41, 42, and 43 are in the state of the contact area direct fixation by the ultrasonic welding. A portion where the state of the contact area direct fixation by the heat is formed by the welding (a fixing portion between the door functional planar member 32 and the electrical wires 41, 42, and 43) may be referred to as a welding part, and herein, the fixing portion by the ultrasonic welding may be referred to as an ultrasonic welding part, and the fixing portion by the heating-pressurizing welding may be referred to as a heating-pressurizing welding part, for example.

In the case of the contact area direct fixation, only the resin included in the door functional planar member 32 may be melted, or only the resin included in the covering of the electrical wires 41, 42, and 43 may be melted. In these cases, the resin which has been melted is stuck on an outer surface of the resin on the other side, and a relatively clear interface may be formed in some cases. In the case of the contact area direct fixation, both the resin included in the door functional planar member 32 and the resin included in the covering of the electrical wires 41, 42, and 43 may be melted. In this case, there may be a case where both the resins are mixed and a clear interface is not formed. Particularly, when the door functional planar member 32 and the covering of the electrical wires 41, 42, and 43 include compatible resin such as the same resin material, for example, there may be a case where both the resins are mixed and a clear interface is not be formed.

When the door functional planar member 32 and the electrical wires 41, 42, and 43 are fixed by the contact area direct fixation, it is sufficient that a surface layer of the door functional planar member 32 and a surface layer of the covering of the electrical wires 41, 42, and 43 are formed by a material which can be fixed by the contact area direct fixation such as a same type of resin material. In this case, both the door functional planar member 32 and the covering of the electrical wires 41, 42, and 43 may be a made up of a single layer. It is also applicable that a fusion layer for the contact area direct fixation is provided on at least one of the door functional planar member 32 and the covering of the electrical wires 41, 42, and 43. In this case, it is applicable that a fusion layer is provided on the door functional planar member 32, thus the door functional planar member 32 is made up of two or more layers, a fusion layer is provided on the covering of the electrical wires 41, 42, and 43, thus the covering of the electrical wires 41, 42, and 43 is made up of two or more layers, or a fusion layer is provided on both of them. In the door functional planar member 32, the fusion layer may be provided on a whole surface of one main surface of the door functional planar member 32, or may also be provided on part thereof where the electrical wires 41, 42, and 43 are fixed (for example, a fixing region illustrated in FIG. 2). In the similar manner, the fusion layer may be provided on a whole periphery of the electrical wires 41, 42, and 43, or may also be provided on part thereof directed to a side of the door functional planar member 32 along a circumferential direction. The fusion layer may be provided in a whole extension direction of the electrical wires 41, 42, and 43, or may also be provided intermittently at intervals along the extension direction.

Assumed in the present example is that a part of the electrical wires 41, 42, and 43 wired on the door functional planar member 32 is fixed by the contact area direct fixation by an ultrasonic welding machine, for example.

In the present example, a fixing region where the electrical wires 41, 42, and 43 and the door functional planar member 32 are fixed may be a region similar to a region where the adhesive agent 50 is provided in the example illustrated in FIG. 2, or may also be continuously formed in a longitudinal direction of the electrical wires 41, 42, and 43.

When the covering wires 41, 42, and 43 are fixed to the door functional planar member 32 by the contact area direct fixation, a member for fixing the covering wires 41, 42, and 43 and the door functional planar member 32 can be omitted.

Figure 6:
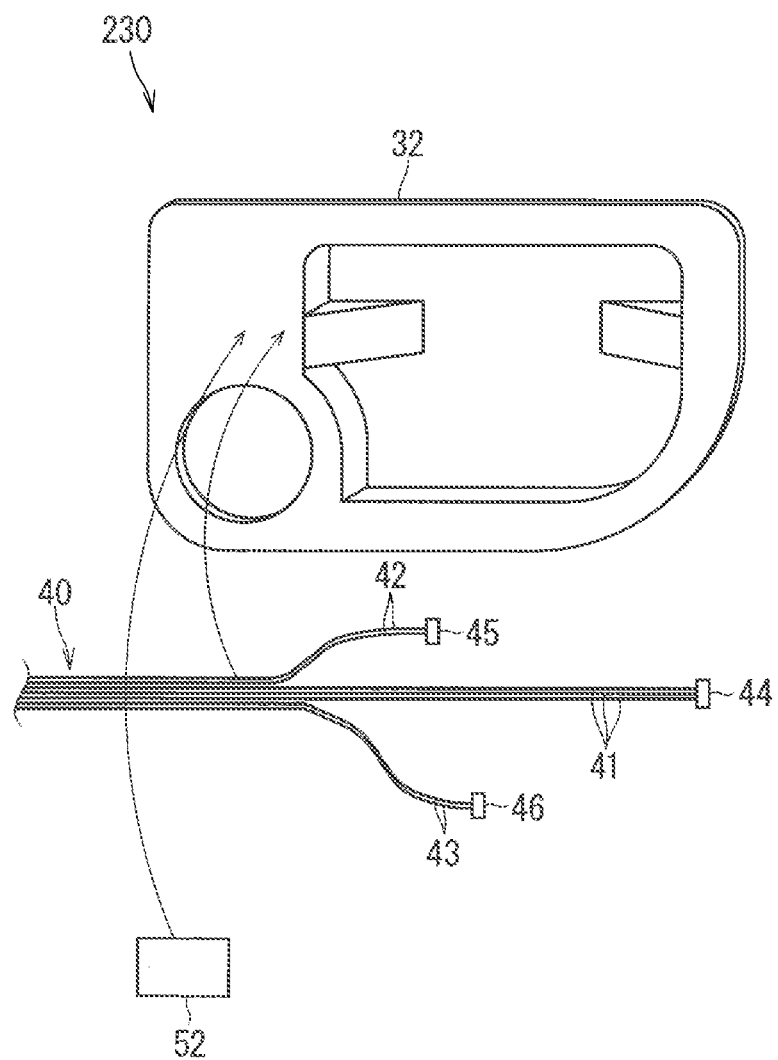
FIG. 6 is a schematic exploded perspective view illustrating a second modification example of the door wiring module.
Figure 7:
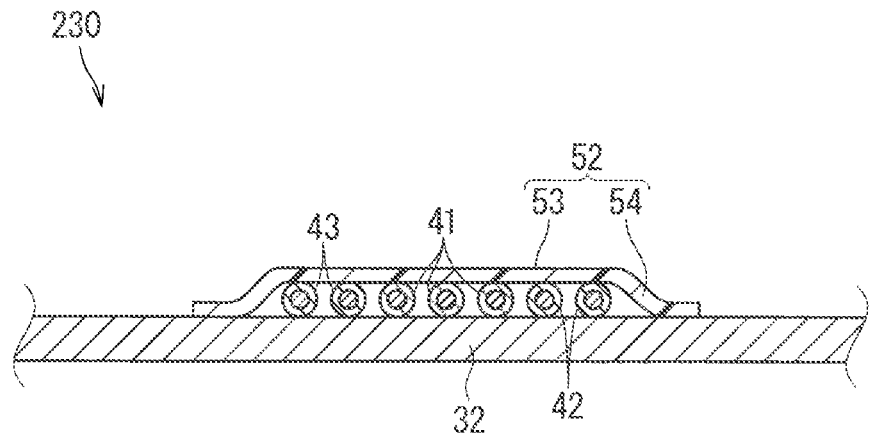
FIG. 7 is a schematic cross-sectional view of the door wiring module according to the second modification example.

FIG. 6 is a schematic exploded perspective view illustrating a second modification example of the door wiring module 30. FIG. 7 is a schematic cross-sectional view illustrating a door wiring module 230 according to the second modification example.

The door wiring module 230 of the present example indicates a case example that the non-contact area fixation described above is applied to the fixation of the door functional planar member 32 and the electrical wires 41, 42, and 43. Particularly, the present example indicates a case example that the wiring member 40 is pressed against the door functional planar member 32 by a fixing sheet 50.

The fixing sheet 52 includes a cover part 53 covering an upper side of the electrical Aires 41, 42, and 43 and a fixing part 54 linked to a lateral side of the cover part 53 and fixed to the door functional planar member 32 on a lateral side of the electrical wires 41, 42, and 43.

The fixing sheet 52 may be an adhesive tape in which an adhesive agent is provided on a whole one surface, for example. In the adhesive tape in this case, a portion adhering to the electrical wires 41, 42, and 43 is the cover part 53 and a portion adhering to the door functional planar member 32 on a lateral side of the cover part 53 is the fixing part 54.

The fixing sheet 52 may be a sheet member in which an adhesive agent is not provided on a whole surface, for example. In this case, the fixation of the fixing part 54 of the fixing sheet 52 which is the sheet member on which the adhesive agent is not provided and the electrical wires 41, 42, and 43 is not particularly limited, however, the contact area direction fixation, the contact area indirect fixation, or the non-contact area fixation described as the fixation of the door functional planar member 32 and the electrical wires 41, 42, and 43 in the embodiment, for example, can be applied. The fixing sheet 52 which is the sheet member and the electrical wires 41, 42, and 43 may not be fixed to each other.

Assumed in the present example is that a portion where the electrical wires 41, 42, and 43 is wired on the door functional planar member 32 is covered by the fixing sheet 52 and the fixing sheet 52 is fixed to the door functional planar member 32.

In the present example, a region where the fixing sheet 52 is provided may be a region similar to a region where the adhesive agent 50 is provided in the example illustrated in FIG. 2, or may also be continuously formed in the longitudinal direction of the electrical wires 41, 42, and 43.

Figure 8:
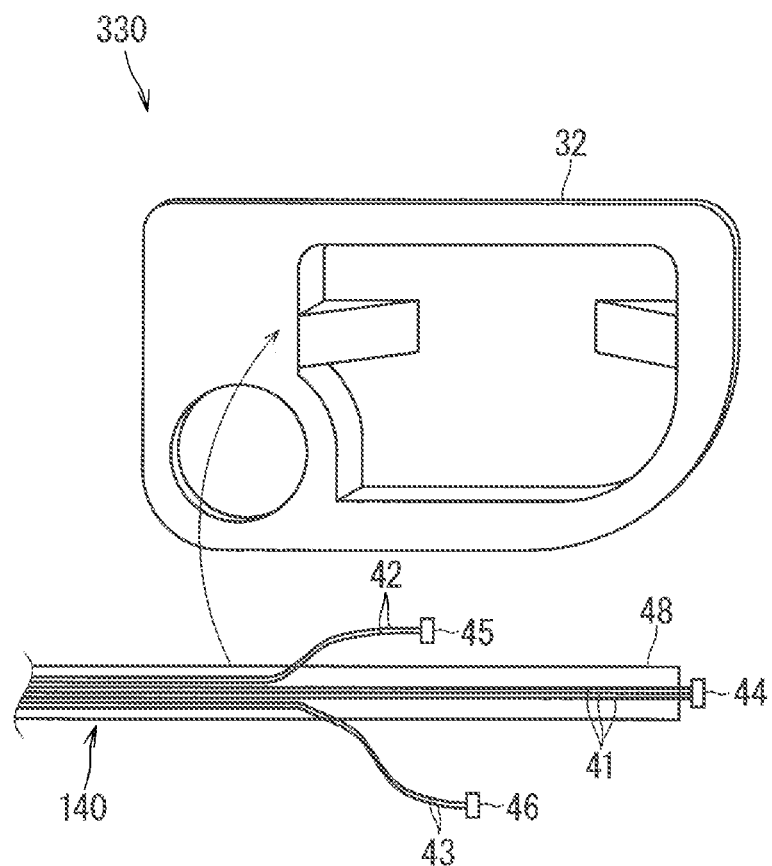
FIG. 8 is a schematic exploded perspective view illustrating a third modification example of the door wiring module.
Figure 9:
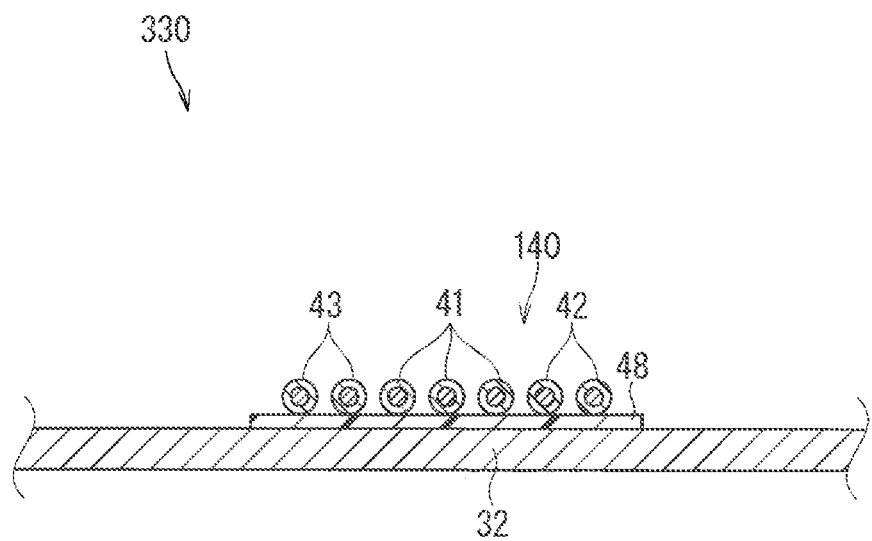
FIG. 9 is a schematic cross-sectional view of the door wiring module according to the third modification example.

FIG. 8 is a schematic, exploded perspective view illustrating a third modification example of the door wiring module 30. FIG. 9 is a schematic cross-sectional view illustrating a door wiring module 330 according to the third modification example. FIG. 10 is a schematic cross-sectional view illustrating the fourth modification example of the door wiring module 30.

The door wiring modules 330 and 430 according to the third modification example and the fourth modification example indicate a case example that a wiring member 140 has a sheet member 48 keeping the electrical wires 41, 42, and 43 in a parallel state and the sheet member 48 is fixed to the door functional planar member 32.

A material constituting the sheet member 48 is not particularly limited, however, the sheet member 48 is formed of a material containing resin of polyvinyl chloride (PVC), polyethylene terephthalate (PET), or polypropylene (PP), for example. The sheet member 48 may be a sheet-like material with an inner portion evenly filled or a non-woven sheet, a woven cloth, or a knitted cloth, for example. The sheet member 48 may contain a material such as metal. The sheet member 48 preferably has flexibility of easily bending in a front-back direction. The sheet member 48 may be made up of a single layer or a plurality of stacked layers. When the sheet member 48 is made up of the plurality of stacked layers, it is considered that a resin layer and a resin layer are stacked, for example. It is also considered that a resin layer and a metal layer are stacked, for example.

In the example illustrated in FIG. 8, the sheet member 48 is formed in a straight form in accordance with the first electrical wire 41, however, this configuration is not necessary. The sheet member may have a bended portion.

In the example illustrated in FIG. 8, the sheet member 48 supports a branch part of the electrical wires 41, 42, and 43. When the electrical wires 41, 42, and 43 branch off in such a manner, the sheet member 48 may also be formed into a branched shape so as to be able to support portions of the electrical wires 41, 42, and 43 extending in different directions after being branched.

The fixation of the sheet member 48 and the electrical wires 41, 42, and 43 is not particularly limited, however, the contact area direction fixation, the contact area indirect fixation, or the non-contact area fixation described as the fixation of the door functional planar member 32 and the electrical wires 41, 42, and 43 in the embodiment, for example, can be applied. For example, in the example illustrated in FIG. 9 and FIG. 10, the sheet member 48 and the electrical wires 41, 42, and 43 are fixed by the contact area direct fixation.

At this time, in the third modification example, a rear surface of the sheet member 48 (a surface on a side opposite to a surface to which the electrical wires 41, 42, and 43 are fixed) is fixed to the door functional planar member 32. In the fourth modification example, a part of a front surface of the sheet member 48 on a lateral side of the electrical wires 41, 42, and 43 (a surface to which the electrical wires 41, 42, and 43 are fixed) is fixed to the door functional planar member 32.

A fixing state of the sheet member 48 and the door functional planar member 32 is not particularly limited, however, the contact area direction fixation, the contact area indirect fixation, or the non-contact area fixation described as the fixation of the door functional planar member 32 and the electrical wires 41, 42, and 43 in the embodiment, for example, can be applied. For example, in the example illustrated in FIG. 9 and FIG. 10, the sheet member 48 and the door functional planar member 32 are fixed by the contact area direct fixation.

Assumed in the third modification example and the fourth modification example is that the electrical wires 41, 42, and 43 are wired on and fixed to the sheet member 48 to be the wiring member 140, and subsequently, the wiring member 140 is disposed on the door functional planar member 32 and the sheet member 48 is fixed to the door functional planar member 32.

Figure 11:
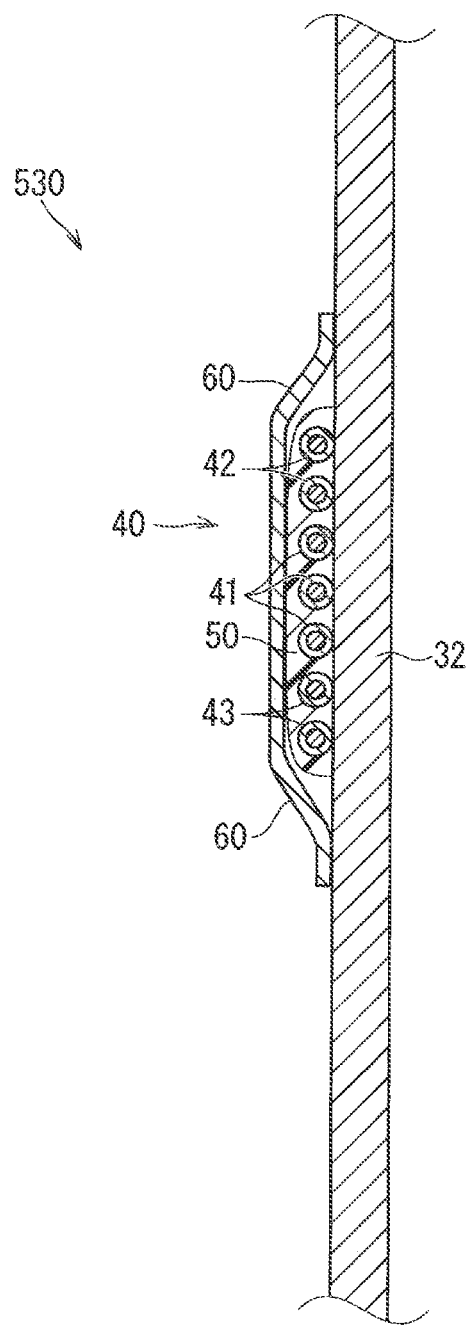
FIG. 11 is a schematic cross-sectional view illustrating a fifth modification example of the door wiring module.

The wiring member 140 further includes the sheet member 48 holding the plurality of covering wires 41, 42, and 43 in a state of being located side by side, and the sheet member 48 is fixed to the door functional planar member 32 in such a manner, thus the wiring member 140 which has been previously wired can be fixed to the door functional planar member 32, FIG. 11 is a schematic cross-sectional view illustrating the fifth modification example of the door wiring module 30.

A door wiring module 530 of the present example indicates a case example that a soundproof member 60 covering the wiring member 40 is further included.

The soundproof member 60 is a member for reducing sound. The soundproof member may be made up of an acoustic material, or may also be made up of a sound insulating material. The acoustic material has a space when seeing a cross section in a thickness direction. The acoustic material absorbs sound energy which has entered, for example, thereby reducing a reflection of sound as much as possible. A material having a large number of small spaces therein such as a foam resin (urethane foam) and a non-woven sheet, for example, can be used as the acoustic material. The sound insulating material does not have a space when seeing a cross section in a thickness direction. The sound insulating material absorbs or reflects the sound energy, thereby cutting sound as much as possible, for example. A material which does not have a space therein such as a resin sheet with an inner portion evenly filled, for example, can be used as the sound insulating material. Any of the acoustic material and the sound insulating material may be used as the soundproof member 60. The soundproof member 60 may double as the function as the acoustic material and the function of the sound insulating material, in the description hereinafter, the sound proof member 60 is the acoustic material 60.

The acoustic material 60 is provided to cover the wiring member 40 from a side opposite to the door functional planar member 32 in a portion where the wiring member 40 is fixed to the door functional planar member 32. In this case, the acoustic material 60 can absorb abnormal noise emitted from the wiring member 40. The acoustic material 60 may be provided on part of the wiring member 40 wired on the door functional planar member 32 along an extension direction, or may also be provided on the whole wiring member 40. It is sufficient that a width dimension of the acoustic material 60 is large enough to cover the plurality of electrical wires 41, 42, and 43 located side by side, and as illustrated in FIG. 11, the acoustic material 60 may be formed so that the dimension thereof is smaller than a width dimension of the door functional planar member 32.

A fixing state of the acoustic material 60 and the door functional planar member 32 is not particularly limited, however, the contact area direction fixation, the contact area indirect fixation, or the non-contact area fixation described as the fixation of the door functional planar member 32 and the electrical wires 41, 42, and 43 in the embodiment, for example, can be applied. For example, in the example illustrated in FIG. 11, the acoustic material 60 and the door functional planar member 32 are fixed by the contact area direct fixation.

Figure 12:
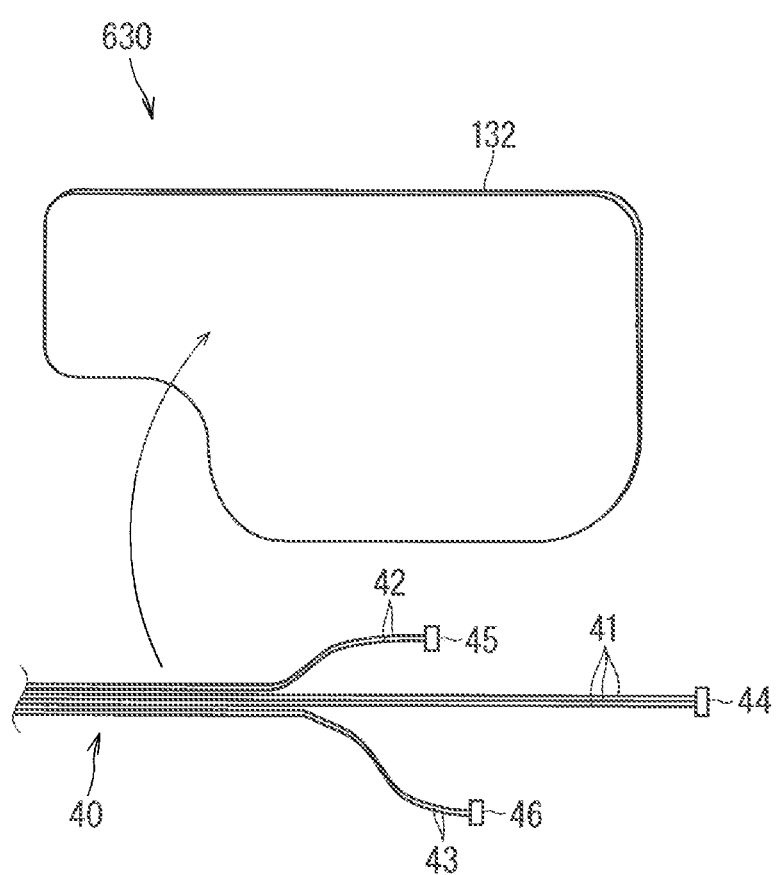
FIG. 12 is a schematic exploded perspective view illustrating a sixth modification example of the door wiring module.

Described in the present example is that the acoustic material 60 is provided on the portion where the wiring member 40 is fixed to the door functional planar member 32 by the adhesive agent 50 as with the case of the door wiring module 30 according to the embodiment, however, the acoustic material 60 may also be provided on the door wiring modules 130, 230, 330, and 430 according to the other fixing states, FIG. 12 is a schematic exploded perspective view illustrating a sixth modification example of a door wiring module.

A door wiring module 630 of the present example indicates a case example that a door functional planar member is a member other than the inner trim 32.

That is to say, in the above description, the door functional planar member 32 is the inner trim 32 covering the opening 15 of the inner panel 14, however, this configuration is not necessary. The door functional planar member may be a waterproof film or a soundproof material as long as it is incorporated between the door panel 12 and the design trim 18. FIG. 12 illustrates an example that the door functional planar member 132 is a waterproof film or a soundproof material.

The waterproof film is a member formed into a sheet-like shape with an inner portion evenly filled with resin as a material, for example. The waterproof film is a member having a layer which does not pass water, and suppresses water intrusion from outside. The waterproof film needs not be made up of only a layer which does not pass water, however, a layer which passes water may be stacked on the waterproof film. For example, the waterproof film may have a configuration that waterproof processing is performed on a base material which passes water and a waterproof layer is formed on a surface thereof.

The soundproof member is a member for reducing sound. The soundproof member may be made up of an acoustic material, or may also be made up of a sound insulating material. The acoustic material has a space when seeing a cross section in a thickness direction. The acoustic material absorbs sound energy which has entered, for example, thereby reducing a reflection of sound as much as possible. A material having a large number of small spaces therein such as a foam resin (urethane foam) and a non-woven sheet, for example, can be used as the acoustic material. The sound insulating material does not have a space when seeing a cross section in a thickness direction. The sound insulating material absorbs or reflects the sound energy, thereby cutting sound as much as possible, for example. A material which does not have a space therein such as a resin sheet with an inner portion evenly filled, for example, can be used as the sound insulating material. Any of the acoustic material and the sound insulating material may be used as the soundproof member. The soundproof member may double as the function as the acoustic material and the function of the sound insulating material.

Also when the door functional planar member 132 is a waterproof film or an acoustic material, the door functional planar member 132 and the wiring members 40 and 140 can be fixed to each other in the manner similar to the fixation of the door functional planar member 32 and the wiring members 40 and 140.

In this manner, when the waterproof film or the acoustic material is adopted as the door functional planar member 132, the waterproof film or the acoustic material and the wiring member 40 can be integrally for d. Particularly, the wiring member 40 can be wired on and fixed to one sheet of waterproof film or acoustic material.

Figure 13:
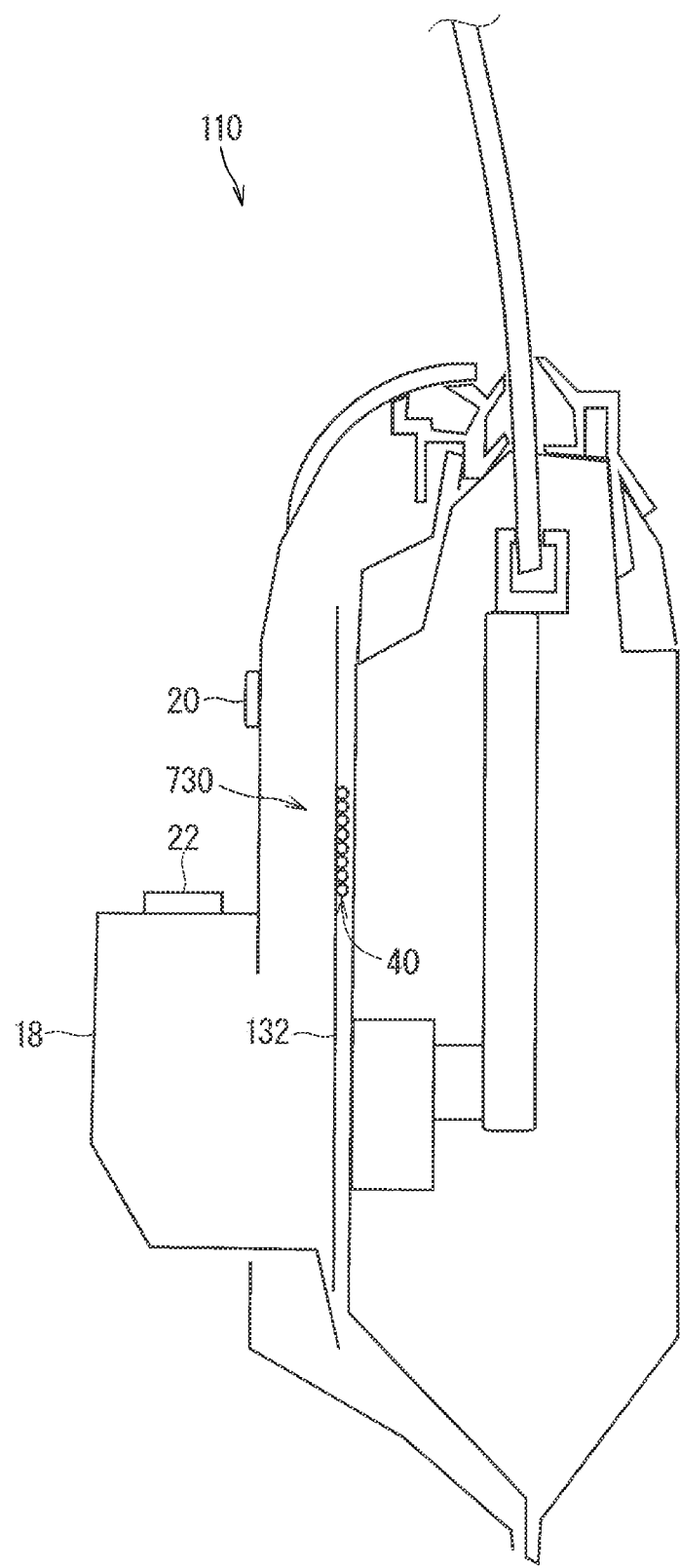
FIG. 13 is a schematic cross-sectional view illustrating a seventh modification example of the door wiring module.
Figure 14:
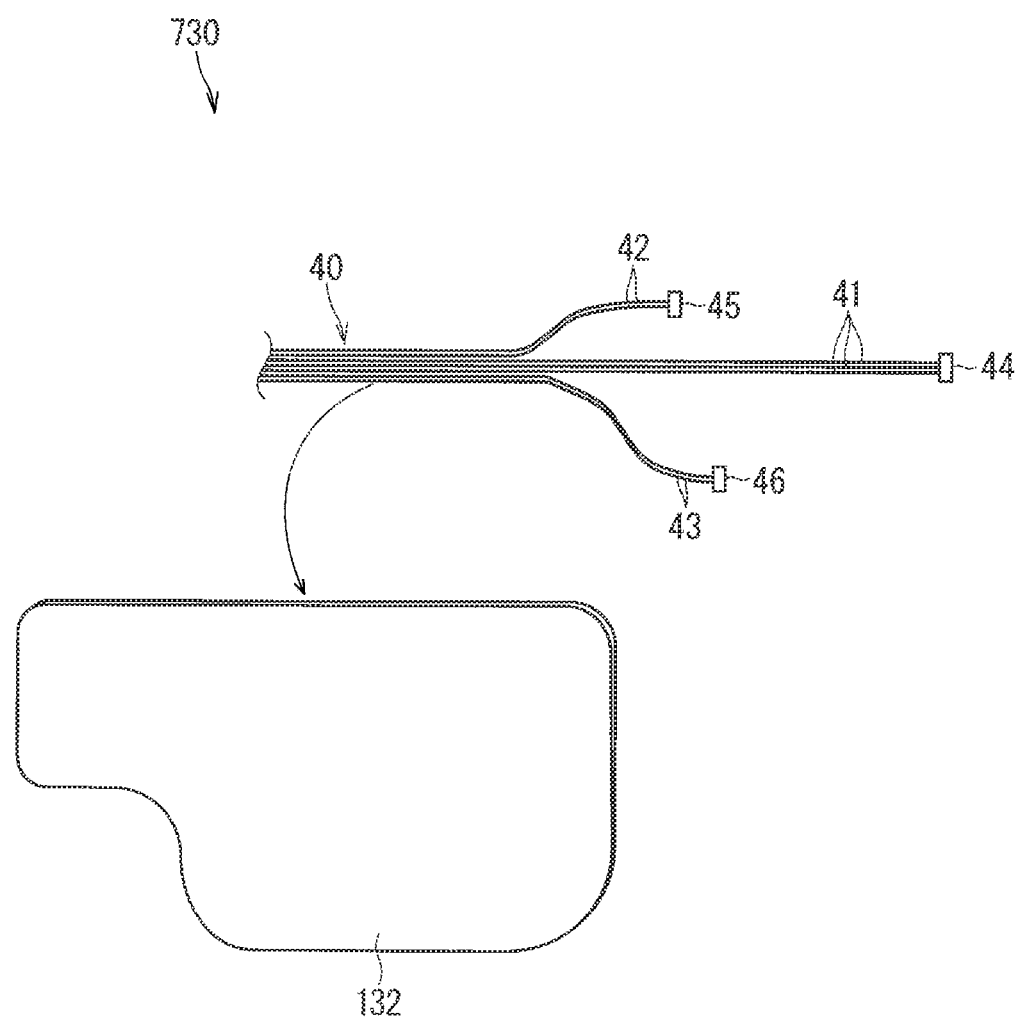
FIG. 14 is a schematic exploded perspective view of the door wiring module according to the seventh modification example.

FIG. 13 is a schematic cross-sectional view illustrating a seventh modification example of the door wiring module 30. FIG. 14 is a schematic exploded perspective view illustrating a door wiring module 730 according to the seventh modification example.

In the above description, the wiring members 40 and 140 are provided on the door functional planar members 32 and 132 on the inner side of the vehicle, however, this configuration is not necessary. The wiring members 40 and 140 may be provided on the door functional planar members 32 and 132 on the outer side of the vehicle in the door wiring module and the door having the door wiring module therein. FIG. 14 illustrates an example that the wiring member 40 is provided on the door functional planar member 132 on the outer side of the vehicle. Also in each example using the door functional planar member 32 and each example using the wiring member 140, the wiring member may also be provided on the door functional planar member on the outer side of the vehicle in the similar manner.

A wiring state of the wiring member 40 in the door wiring module described above is for exemplification, thus the wiring state of the wiring member 40 in the door wiring module is not limited thereto described above. For example, the other end portion of the wiring member 40 may extend to the outer side from the door functional planar member 32. The wiring member 40 may include a fourth electrical wire branching off from the first electrical wire 41, the second electrical wire 42, and the third electrical wire 43 in the same position as or a position different from branch positions of the first electrical wire 41, the second electrical wire 42, and the third electrical wire 43.

In the above embodiment, the case where the wiring member 40 is the electrical wires 41, 42, and 43 is described, however, the wiring member 40 may be a band-like wiring member made up of a plurality of linear conductors covered in a parallel state such as a flexible flat cable, for example. Tit is sufficient that the wiring member is a flat wiring member which is flatly formed.

Each configuration described in the embodiment and each modification example can be appropriately combined as long as they are not contradictory.

EXPLANATION OF REFERENCE SIGNS 10 door
12 door panel
13 outer panel
14 inner panel
15 opening
18 design trim
30 door wiring module
32 door functional planar member
40 wiring member
41 first electrical wire
42 second electrical wire
43 third electrical wire
44, 45, 46 connector
48 sheet member
50 adhesive agent
52 fixing sheet

The invention claimed is:

1. A door wiring module, comprising:
a door functional planar member incorporated between a door panel and a design trim in a door of a vehicle; and
a wiring member wired on a planar part of an inner main surface of the door functional planar member to be fixed to the door functional planar member, wherein
the wiring member includes a plurality of covering wires wired side by side on the inner main surface of the door functional planar member and a sheet member holding the plurality of covering wires in a state of being located side by side, the sheet member including a first main surface and a second main surface on a side opposite to the first main surface,
the plurality of covering wires are fixed on the first main surface of the sheet member, and
the sheet member is fixed to the door functional planar member in a state where the second main surface of the sheet member faces the door functional planar member, and the sheet member is located only between the plurality of covering wires and the door functional planar member in a thickness direction of the door functional planar member.

2. The door wiring module according to claim 1, wherein both lateral side portions of a part of the sheet member to which the plurality of covering wires are fixed are fixed to the door functional planar member.

3. The door wiring module according to claim 1, wherein the door functional planar member is an inner trim.

4. The door wiring module according to claim 1, wherein the door functional planar member is a waterproof film.

5. The door wiring module according to claim 1, wherein the door functional planar member is a soundproof member.

6. The door wiring module according to claim 1, wherein a storage space forming part is provided in the door functional planar member, the storage space forming part having a container shape opened in the inner main surface of the door functional planar member and protruding toward an outer main surface of the door functional planar member, the outer main surface being on a side opposite to the inner main surface.

7. The door wiring module according to claim 6, wherein
at least one wiring support protrusion part is provided to protrude from an outer periphery of the storage space forming part of the door functional planar member toward an inner side of the storage space forming part, and each of the at least one wiring support protrusion part has an inclined surface whose dimension in the thickness direction of the door functional planar member reduces from the outer periphery of the storage space forming part toward a bottom of the storage space forming part, as the inclined surface extends toward the inner side of the storage surface forming part.

8. The door wiring module according to claim 6, wherein
an electrical component to which an end of the wiring member is connected is accommodated in the storage space forming part.

9. The door wiring module according to claim 1, wherein
the plurality of covering wires and the sheet member attached to the plurality of covering wires extend out of the door functional planar member.

\* \* \* \* \*